United States Patent [19]

Creps et al.

[11] 4,055,497
[45] Oct. 25, 1977

[54] HOLD-DOWN MECHANISM FOR SCRAPER CONVEYOR AND SETTLING TANK

[75] Inventors: John L. Creps, Rudolph; Stephen N. McEwen, Bowling Green; Arthur D. Myerholtz, Portage, all of Ohio

[73] Assignee: Henry Manufacturing Co., Inc., Bowling Green, Ohio

[21] Appl. No.: 731,307

[22] Filed: Oct. 12, 1976

[51] Int. Cl.² .......................................... B01D 21/18
[52] U.S. Cl. .................................. 210/91; 210/407; 210/526
[58] Field of Search ................ 210/91, 526, 407, 158, 210/159; 209/198, 463, 464, 492

[56] References Cited

U.S. PATENT DOCUMENTS

| | | | |
|---|---|---|---|
| 1,435,770 | 11/1922 | Welser, Sr. | 210/158 |
| 3,511,383 | 5/1970 | Clyne | 210/526 |

*Primary Examiner*—John Adee
*Attorney, Agent, or Firm*—Hugh A. Kirk

[57] ABSTRACT

A settling tank having a flat bottom and an inclined side extending from an arcuate corner along one side of said bottom, a drag-out conveyor means along said bottom around said arcuate corner and up said inclined side, and a mechanism for permitting the idler sprocket or roller of the conveyor to move away from said arcuate corner to prevent jamming, as well as to control the thickness and/or to sense the drag of the settlings on the bottom of the tank. This conveyor hold-down control mechanism comprises an adjustable elongated means parallel to said inclined side, pivoted at one end above the normal surface of liquid in said tank, and at the other end to the idler sprockets or rollers for the conveyor at the arcuate corner, for normally resiliently urging said idlers into said corner, as well as indicating when said idlers move away from said corner by encountering foreign objects which otherwise would jam the conveyor. This movement of said idlers may be directed by a lever forming a toggle arrangement, the knee of which is at the axis of said idlers; or it may be directed by guide means for the axis of said idlers fixed to the opposite sides of said tank. The lever forming the toggle arrangement may be pivoted to a shaft for the idlers along the bottom of the tank, or to the opposite sides of the tank. The indication of the movement of said toggle may be visual and/or audible as well as including means for controlling, cycling and/or stopping the operation of the drag-out conveyor.

18 Claims, 8 Drawing Figures

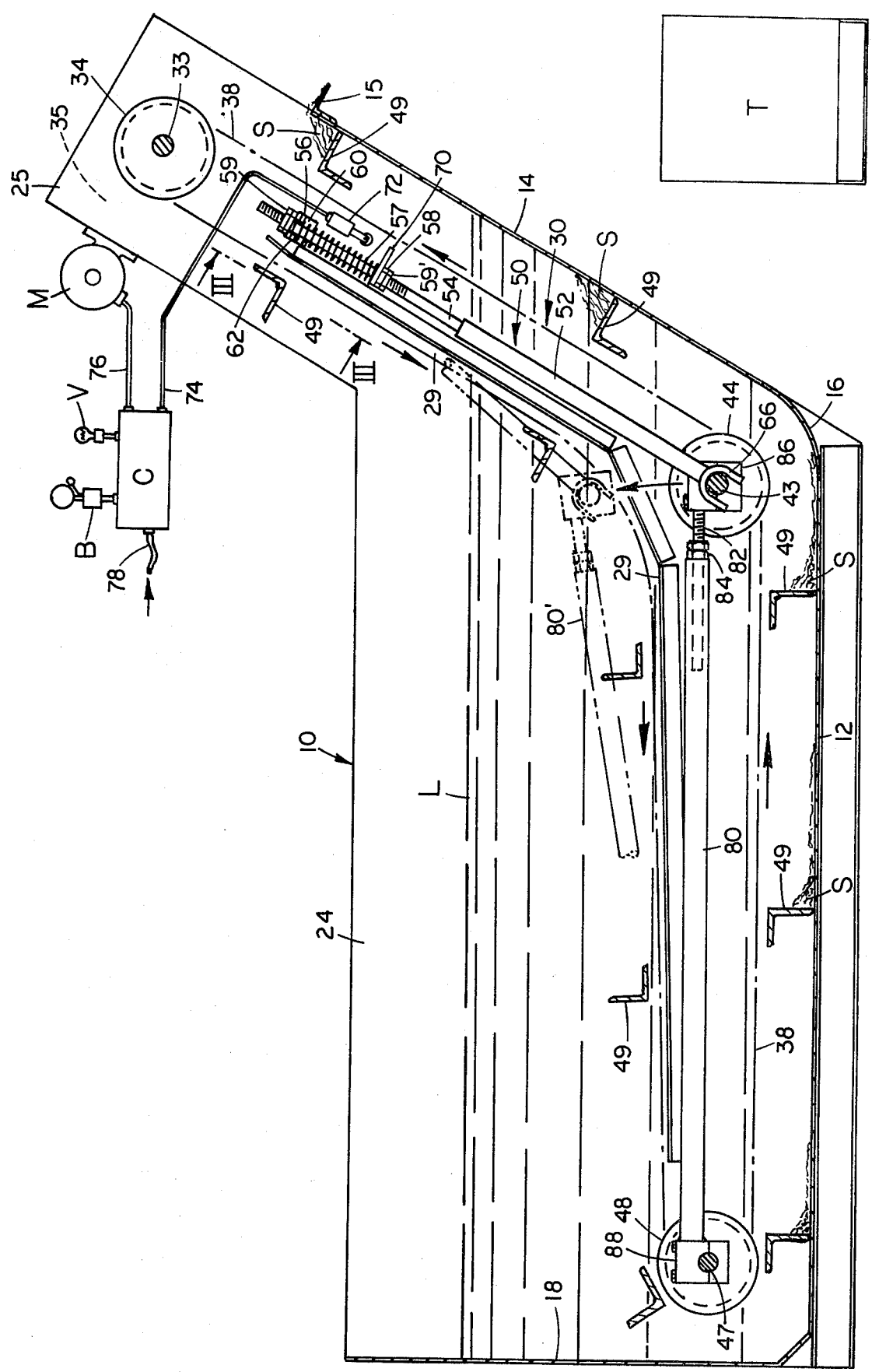
FIG. I

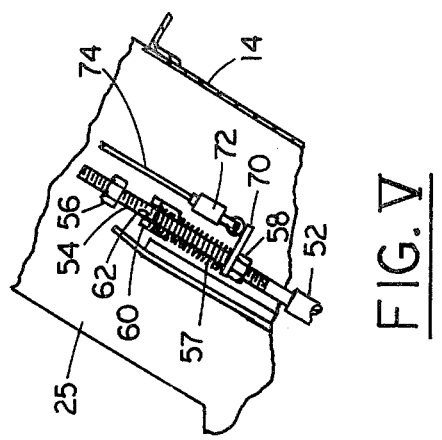
FIG. V
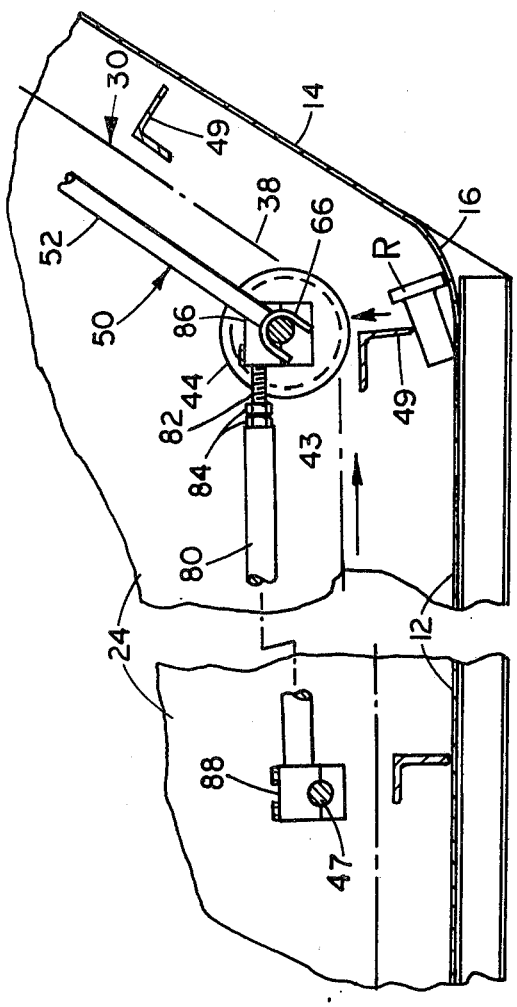
FIG. IV
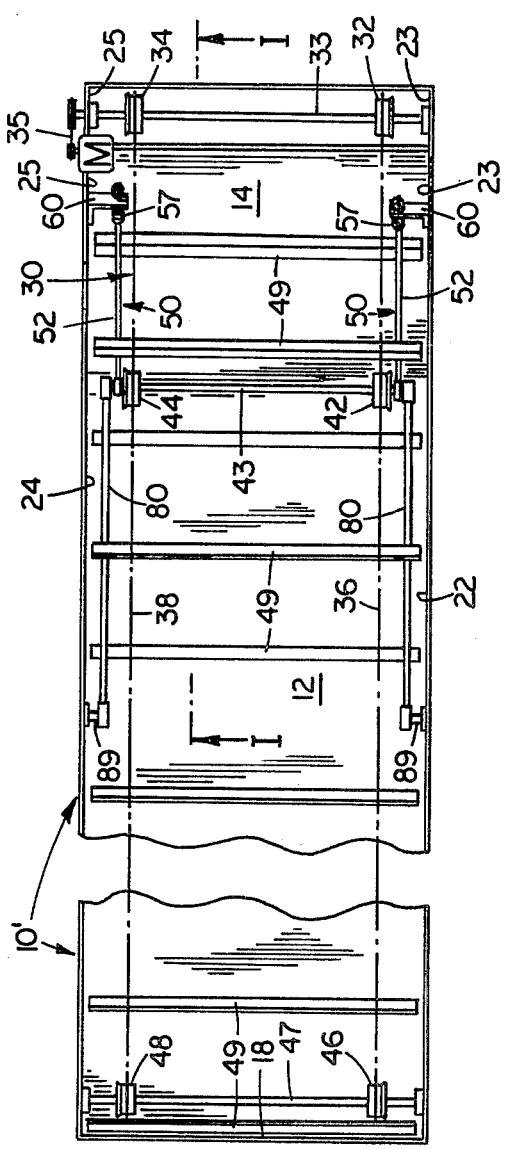
FIG. II
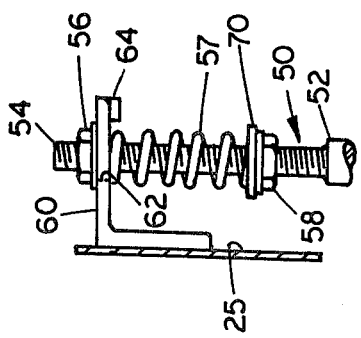
FIG. III

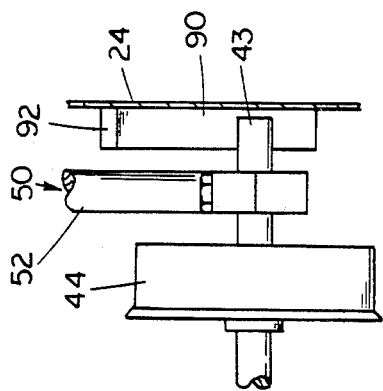
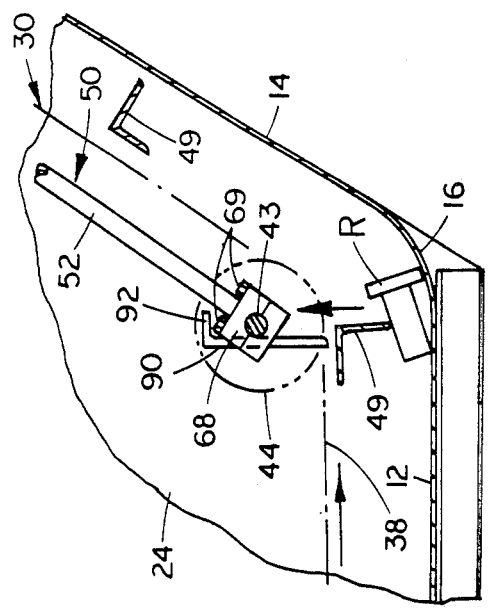
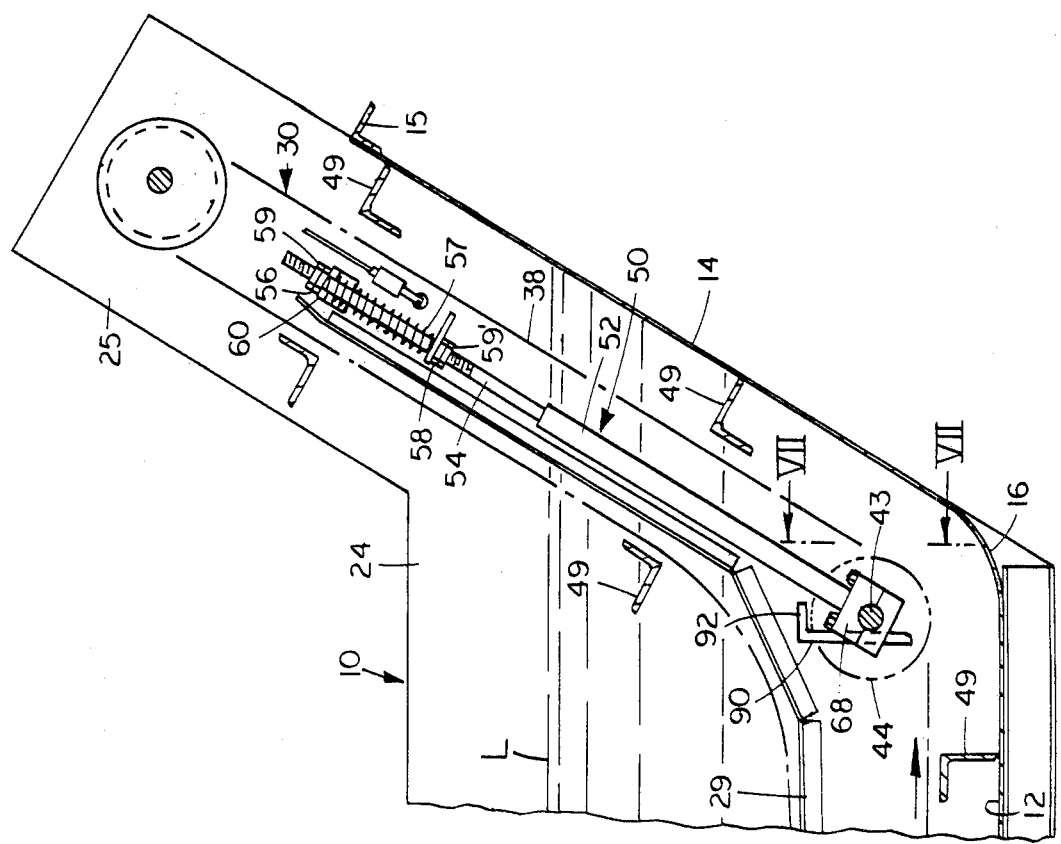

HOLD-DOWN MECHANISM FOR SCRAPER CONVEYOR AND SETTLING TANK

BACKGROUND OF THE INVENTION

In settling tanks for the removal of solids from liquids such as cuttings in coolants, often large objects are accidentally or otherwise dropped into the open settling tanks which often cause jamming of their drag-out conveyors employed for removal of the settlings from these tanks. Furthermore, it is rarely possible to see through the liquid in these tanks to determine what actually caused the jamming of their conveyors. Thus, it was necessary to drain the tank to repair the conveyor and remove the object that caused its damage, all of which causes much loss of time and is very expensive.

Although spring-urged idler sprockets for drag-out conveyors have been employed at the bottom of ramps or inclined sides of receptacles, their compression has never been controlled and indicated above the surface of the material in the receptacles or arranged to be free from being contaminated by the material in he receptacle.

Furthermore, no means known has ever been employed to sense the drag on the conveyor along the bottom of the tank only without sensing the drag up the ramp of the conveyor, which sensing can also be employed for controlling the amount of settlings remaining on the bottom of the tank, particularly if a filter is placed in the bottom of the tank which requires a predetermined thickness of settlings thereon.

SUMMARY OF THE INVENTION

Generally speaking, this invention relates to a settling tank for solids suspended in liquids such as dirty coolants, which tank has a drag-out conveyor for the settled solids. Thus the configuration of the tank comprises a flat bottom, which may be a filter bed, and a sloping side adjoined to that bottom along one edge thereof, which juncture preferably has a radius to conform with the radius of the scrapers on the drag-out conveyor as they pass under idler sprockets or rollers located at this juncture. The drag-out conveyor usually comprises a pair of parallel sprocket chains along opposite parallel sides of the tank which extend along the bottom of the tank and up the sloping or ramp side to a point above the highest liquid level employed in the tank. Between these two parallel sprocket chains are attached conveyor flights which scrape along the flat bottom of the tank, around the curved juncture to the ramp, and up the ramp above the liquid level for removing the settlings in the tank and dumping them out over the upper edge of the ramp. This conveyor is driven by a motor or other suitable means connected to a shaft for the sprocket wheels above the liquid level, preferably at the top end of the ramp. At the opposite end of the conveyor at the far end of the bottom of the tank from that of the ramp, there are provided turn-around idler sprockets or rollers on a shaft usually fixedly journalled to the tank. Another shaft for idler sprockets or rollers is located at the juncture between the bottom and ramp. If desired, other idlers may be provided along the reaches of the conveyor sprocket chains along the bottom and/or up the ramp, which shafts for the idlers are fixedly journalled in or to opposite parallel sides of the tank. In this invention, however, the shaft for the idlers along the juncture between the ramp and bottom are mounted on a shaft which may float away from the arcuate corner juncture to prevent jamming of articles under the conveyor at this juncture. This invention is directed to an anti-jamming hold-down mechanism fro the support, control, and guidance of this floating shaft for the idler sprockets at this juncture.

This anti-jamming mechanism normally holds down or urges the shaft for the drag-out conveyor's idlers toward the arcuate corner at the juncture between the bottom and ramp of the settler and may comprise at least one, and preferably a pair, of longitudinally adjustable rods or bars that extend along and are parallel to the ramp of the tank. These bars are in effect pivotally connected at their upper ends above the liquid level of the tank near the upper end of the ramp. At their other or lower ends, they are pivotally connected to the shaft of the idler sprockets or rollers at the juncture of the ramp with the bottom of the settling tank. The upper pivotal connection may comprise a loose mounting of the bars in slots or notches with spring means for holding them in place and urging the idlers at the other ends of these bars to hold the scrapers of the drag-out conveyor against and into the arcuate corner of the tank. Thus, if a foreign object of considerable size, compared to the settlings from the liquid in the tank, is accidentally dropped or is thrown into the tank, it will not jam the conveyor at this arcuate corner, but instead the foreign object will cause the idler shaft to be moved away from the corner against the action of the spring means so the flight passes over the object without damaging or jamming the normal operation of the conveyor. Usually such riding over the object permits the following flight on the conveyor to properly engage this object and drag it out. Furthermore, the movement of these bars, above the murky liquid in the tank, can operate a sensor or sensors, such as micro-switches, to give a visual, audible, or both type of signals, as well as to automatically control, index and/or shut off the motor that drives the conveyor if a certain predetermined amount or amounts or movement occurs.

In order to direct the movement of the idlers and their shaft away from the arcuate corner of the settling tank, an additional one or pair of bars or a frame may be located along the bottom of the tank, which bars are pivotally connected at one end to this idler shaft, and at their other end to the next adjacent idler shaft or to the opposite sides of the tank. Thus this frame or bars in combination with the rod means or bars along the ramp, forms a toggle mechanism. Instead of a toggle mechanism, there may be provided fixed guide means and/or stop means attached to the opposite parallel sides of the tank for controlling, guiding and limiting the upward motion of the shaft for these idlers at the arcuate corner.

OBJECTS AND ADVANTAGES

Accordingly, it is an object of this invention to produce an efficient, effective, simple, economic and visually operable anti-jamming mechanism for a drag-out conveyor in the bottom of a settling tank which will prevent the stopping of the conveyor, as well as to remove solid obstacles which would normally cause such stopping or jamming.

Another object is to produce an efficient, effective, simple and economical hold-down mechanism for a drag-out conveyor in the bottom of a settling tank for sensing the drag on the conveyor by the settlings, as well as for controlling the thickness of the settlings, particularly if they are to be maintained as a filter bed.

Still another object is to produce such a hold-down mechanism for a drag-out conveyor in the bottom of a settling tank which mechanism is adjustable for maintaining tension on the conveyor chains, as well as to compensate for wear, particularly of the conveyor flights.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. I is a vertical section through a settling tank employing one embodiment of the hold-down mechanism of this invention, with an alternate position of this mechanism being shown in dotted lines;

FIG. II is a plan view of a mechanism similar to tha shown in FIG. I, in a longer settling tank;

FIG. III is an enlarged view of the upper end mounting of the hold-down mechanism shown along line III—III of IFG. I;

FIG. IV is an enlarged view of the juncture between the bottom and ramp of the tank as shown in FIG. I, with a foreign object under the flight of the conveyor raising its idler sprocket against the action of the anti-jamming mechanism of this invention;

FIG. V is a view of the upper end of the anti-jamming and/or control mechanism shown in FIGS. I and III, corresponding to FIG. IV with its spring compressed and operating a micro-switch;

FIG. VI is a view of the ramp end of a settling tank disclosing another embodiment of the hold-down mechanism of this invention with a fixed guide and stop for the lower end thereof;

FIG. VII is an enlarged view taking along line VII—VII of FIG. VI of the fixed guide and stop; and FIG. VIII is a view similar to that of FIG. IV but of the embodiment shown in FIGS. VI and VII engaging a foreign object.

DETAILED DESCRIPTION OF PREFERRED EMBODIMENTS

Settling Tank

Referring first to FIG. I there is disclosed a settling tank 10 having a flat bottom 12, a ramp or incline side 14 along one edge of the flat bottom 12 to which it is joined by a curved or arcuate corner portion 16. This flat bottom 12 may be perforated or contain a filtering screen upon which a predetermined thickness of settlings are maintained as a filter bed. Furthermore, this filtering may be augmented by a suction means (not shown). The tank also may comprise an opposite vertical side or end 18 and intermediate parallel sides 22 and 24. These sides 22 and 24 may extend upwardly parallel to the ramp side 14 to provide extension portions 23 and 25, respectively, for mounting the driving end of the drag-out conveyor 30 above the normal level L of liquid in the settling tank 10.

The drag-out conveyor 30 is located along the bottom 12 and up the ramp side 14 having a bend adjacent the corner portion 16 of a curvature concentric with the axis of the idler shaft 43 for the sprockets 42 and 44 in their normal position at this juncture. This conveyor 30 may comprise a pair of driven sprockets 32 and 34 affixed to a shaft 33 which may be driven through sprocket chain 35 or other gearing by a driving motor M that is mounted on a bracket between the extensions 23 and 25 of the parallel tank sides 22 and 24. Around these parallel sprockets 32 and 34 are a pair of sprocket chains 36 and 38 which extend around idler sprockets 42 and 44 at the juncture portion 16, which idler sprockets or rollers 42 and 44 are mounted on a floating idler shaft 43 held down by the anti-jamming and control hold-down mechanism 50 of this invention. The reaches of chains 36 and 38 of this conveyor 30 may then extend to the opposite end of the bottom of the tank 12 where they are guided around rear sprockets or rollers 46 and 48 mounted on idler shaft 47, which shaft 47 may be journalled adjacent and to the opposite sides 22 and 24 of the tank 10. If desired, the tank 10 may be extended longer than just for the three sprocket-guiding shafts 33, 43 and 47 shown in FIG. I. Such a longer tank 10' is shown in FIG. II with other idler sprockets or rollers on parallel shafts (not shown because in the broken away portion) intermediate the shafts 43 and 47. Such additional idlers also may be provided along the ramp side 14 in large tanks. Parallel to each other and connected between the sprocket chains 36 and 38 are scraper flights 49 which move the settlings S from the bottom of the tank up the ramp side 14 and over its upper edge 15 for dumping into a tote box T or onto a conveyor or other means for removal thereof. If desired, the opposite parallel sides 22 and 24 and their extensions 23 and 25 respectively of the tank 10 may be provided with reinforcing angle strips 29 inside the tank which also may support the ends of flights 49 and/or the return reaches of the conveyor chains 36 and 38 from the driving sprockets 32 and 34 to the rear idler sprockets or rollers 46 and 48.

ANTI-JAMMING AND CONTROLLING HOLD-DOWN MECHANISM

The hold-down mechanism 50 primarily comprises at least one and preferably a pair of parallel bars 52, each of which may have threaded extensions 54 at their upper ends. These extensions are provided with spaced nuts 56 and 58 between which are mounted compression springs 57 and one of the legs of supporting L-shaped brackets 60, the other legs of which are attached to the extension side or sides 23 and 25 of the tank 10. Said one of said legs have a U-shaped notch 62 therein for seating the threaded extension 54. On each side of the notch 62 at the outer ends thereof are ears or flanges 64 to prevent the springs 57 and the extensions 54 from sliding out of their notches 62. Thus by adjusting the nuts 56 and 58, the amount of compression on the springs 57 may be varied, as well as the length and travel or movement longitudinally of the rods 52 whose opposite ends are journalled to the floating idler shaft 43. This opposite end may be provided with a U-shaped saddle member 66 as shown in FIGS. I and IV for straddling the shaft 43, or it may be provided with a split bearing means 68 as shown in the embodiment of FIG. VIII, which bearing means 68 may be held together by a pair of bolts 69. The nuts 56 and 58 also may be held in position by lock nuts 59 and 59' as shown in FIG. I, if desired. These nuts 56 and 58 also may be used for maintaining a predetermined tension on the conveyor flights 49 that drag along the bottom 12 of the tank 10, as well as to compensate for wear of the scraping edges of these flights 49.

Since the upper end of the anti-jamming and controlling hold-down mechanism 50 comprising the threaded shaft and spring 57 is always above the level L of the liquid in the tank, it is readily visible by any operator, so that the operator can readily see if there is any movement in the rods 52 caused by the movement of the idler shaft 43 away from the arcuate portion 16 when a flight engages an object, such as a bolt or rivet R (see FIGS. IV and VIII), that it cannot push easily around the corner section 16. Since it is not always feasible to continuously observe this situation, there may be provided an extension means 70 attached to the nut 58 for engagement with a fixed limit or micro-switch 72 mounted on the side 23 or 25 of the tank 10. Thus when the projection or bracket 70 engages this switch 72, a circuit will be either made or broken to signal via conductor cable 74 an electrical control box or panel C to operate either an audible alarm such as a bell B, or a visual signal V, and/or, if desired, stop the driving motor M via electrical cable 76. The power supply for these elements and their control may be from an input electrical source cable 78 to the box C. It is to be understood that the location of the lever 70 may be clamped between a pair of nuts anywhere along the extension 54, for either indicating or signalling the initial movement or jamming of a particle underneath the drag-out conveyor 30 at the juncture. The location of this and/or another switch 72 may be used to signal initial movement and/or for stopping the conveyor 30 when a predetermined maximum limit of movement is reached. Thus, the hold-down mechanism 50 can also be used for sensing the amount of pull or drag on the corner idlers 42 and 44 for indicating when the conveyor should be started, stopped, indexed or cycled, such as for maintaining a predetermined bed over a filter that may be employed in the bottom 12 of the tank 10.

GUIDE MEANS

Referring first to the embodiment shown in FIG. I through IV, there is shown also pivotally connected to the floating idler shaft 43 a pair of bars 80 which may be connected together in a frame, which bars 80 are located between the to-and-from reaches of the conveyor 30 along the bottom of the tank 10. One end of each of these bars 80 may be provided with a threaded extension 82 which may be adjustably held by a pair of lock nuts 84 for tensioning the reaches of the sprocket chains 36 and 38 along the bottom of the tank 10. Attached to one end of the bar member 80 may be a split journal bearing 86, as shown in FIGS. I and IV, which is attached to the shaft 43 for further support and guiding of the shaft 43. The opposite ends of the bars 80 may be similarly pivotally connected to either the next adjacent idler shaft 47 as shown in FIG. I by means of split bearings 88, or they may be connected to stub shafts 89 in the side of the tank as that shown in FIG. II. Usually the length of these bars 80 is about six feet, depending upon the size of the tank 10. Thus the pivoted connections at the ends of the bars 80 together with the bars 52 of the hold-down mechanism 50 form, in effect, a toggle arrangement for guiding the floating idler shaft 43 upwardly on a radius the length of the arms 80, such as to a position 80' shown in dotted lines at FIG. I. This upward movement caused by an obstacle, such as a bolt or rivet R as shown in FIG. IV, causes the arms 80 to angle upwardly about the pivot around shaft 47 or stub shafts 89, and the arms 52 of the hold-down mechanism 50 to angle outwardly from the sloping side 14 as well as compress the springs 57 as shown in FIG. V. However, for the particular sized obstruction of foreign matter as bolt R shown, it may not necessarily cause a signal or stopping of the conveyor by engagement of the lever 70 with the switch 72 as shown in FIG. V. Then as soon as the object R is riden over by the flight 49 in contact therewith as shown in FIGS. IV and VIII, the springs 57 will return the idler shaft 43 to its position shown in FIGS. I and VI, the object R may be moved into another position so that it can be engaged and carried out by the following flight 49, without jamming or causing any difficulty or stoppage of the conveyor.

Instead of using the toggle arrangement as shown in FIGS. I through IV, there may only be provided a fixed angle bracket guide and/or stop means 90 as shown in FIGS. VI, VII, and VIII for guiding the upward movement of the shaft 43, by engagement of the ends of the shaft 43 as shown in FIG. VIII. This movement also may be limited by a flange 92 on the means 90.

While there is described above the principles of this invention in connection with a specific apparatus, it is to be clearly understood that this description is made only by way of example, and not as a limitation to the scope of this invention.

We claim:
1. A hold-down mechanism for a drag-out conveyor along the bottom and the ramp side of the settling tank, comprising:
   A. control means extending along the ramp side of said tank and being connected for slight pivotal movement at its upper end near the upper end of said ramp side and being pivotally connected at its lower end to the bend in said conveyor near the bottom of said ramp side for supporting said conveyor at said bend,
   B. guide means in said tank engageable with the lower end of said control means, and
   C. resilient means for urging the bend of said conveyor toward the bottom of said tank.
2. A mechanism according to claim 1 wherein said control means comprises a pair of parallel bar means attached to opposite sides of said tank.
3. A mechanism according to claim 1 wherein said control means is longitudinally adjustable.
4. A mechanism according to claim 1 wherein said control means is connected by means of slotted brackets to opposite sides of said tank to form connections permitting said slight pivotal movement.
5. A mechanism according to claim 1 wherein said control means includes means for sensing the movement thereof.
6. A mechanism according to claim 5 wherein said sensing means comprises switch means engageable by predetermined movement of said control means.
7. A mechanism according to claim 1 wherein said guide means comprises a pair of bar means substantially parallel to the bottom of said tank pivoted at one end to said control means at said bend and pivoted at the other end to said tank to form a toggle with said control means.
8. A mechanism according to claim 1 wherein said guide means comprises a bracket affixed to said tank adjacent the bend in said conveyor.
9. A mechanism according to claim 8 wherein said guide means is longitudinally adjustable.
10. A mechanism according to claim 1 wherein said resilient means comprises a compression spring between said control means and its connection near the top of said ramp side.
11. In a settling tank having a bottom and a sloping side and a drag-out conveyor along said bottom and up said sloping side for removing settlings from a contaminated liquid in said tank, said conveyor having parallel flights extending transversely between parallel reaches of sprocket chain extending around at least a pair of driving sprockets at the upper end of said sloping side and a pair of idlers at opposite ends of the bottom of said tank, the bottom idlers at the bottom of said sloping side being floating, the improvement comprising:
  A. an arcuate wall portion of said tank between the bottom and sloping side of said tank concentric with the axis of said floating idlers when in their normal position with said flights scraping the bottom and sloping side of said tank,
  B. a hold-down mechanism extending along said sloping side of said tank with its upper end above the liquid level in said tank being movably connected to said tank and its lower end being pivotally connected to said floating idlers for controlling their movement,
  C. means in said tank for guiding the movement of said floating idlers, and
  D. resilient means at the upper end of said hold-down mechanism for urging said floating idlers toward the bottom of said tank.

12. In a settling tank having a bottom and an adjacent ramp side and a drag-out conveyor along said bottom and up said ramp side, the improvement comprising:
  A. an arcuate wall portion in said tank between said bottom and said ramp side having a radius corresponding to the bend in the dragging edge of said conveyor between said bottom and said ramp side,
  B. control means connected near the top of said ramp side and extending downwardly along said ramp side to support said bend in said conveyor for controlling and indicating movement of said conveyor away from said arcuate portion.
  C. means for guiding the movement of said control means, and
  D. resilient means associated with said control means for urging the bend of said conveyor toward said arcuate portion.

13. A tank according to claim 12 wherein said controlling means includes means for signalling the movement thereof.

14. A tank according to claim 12 wherein said controlling means includes means for controlling the movement of said drag-out conveyor when said controlling means has been moved to a predetermined position.

15. A hold-down mechanism for a drag-out conveyor along the bottom and ramp side of a settling tank, comprising:
  A. a first means extending along the bottom of said tank and being horizontally pivoted at its end away from the ramp and pivoted at its other end to said conveyor at the bottom end of said ramp side,
  B. a second means extending along said ramp side pivoted to the said conveyor adjacent said first means at the bottom of said ramp side, and loosely connected at its other end to the sides of said tank near the top of said ramp side, and
  C. means on a least one of said first and second means for urging said conveyor at the pivoted connection between them towards the bottom of said tank and ramp side whereby said first and second means form a toggle.

16. A mechanism according to claim 15 including a longitudinal adjusting means on at least one of said first and second means.

17. In a settling tank having a bottom and a sloping side and a scraper conveyor for removing settlings from said bottom and up said side out of said tank, said conveyor having parallel supporting shafts at least at the ends of said bottom and near the top of said sloping side, the improvement comprising a mechanism for said conveyor for resiliently urging said conveyor against the juncture between said bottom and said sloping side, said mechanism comprising:
  A. a first portion extending normally parallel to said bottom,
  B. means for horizontally pivoting said first portion to said tank at its end remote from said sloping side,
  C. means for longitudinally adjustably supporting said conveyor at said juncture at the other end of said first portion,
  D. a second portion extending normally parallel to said sloping side,
  E. means for connecting the upper end of said second portion for slight pivotal movement near the top of said sloping side,
  F. means for pivotally connecting the other and lower end of said second portion at said juncture to said conveyor, and
  G. resilient means on said second portion for urging said conveyor towards said bottom of said tank.

18. A settling tank according to claim 17 including means connected to said second portion for sensing the movement of said conveyor at said juncture away from said bottom.

* * * * *